United States Patent
Wijnands et al.

(10) Patent No.: US 9,344,357 B2
(45) Date of Patent: May 17, 2016

(54) LABEL-SWITCHED PATH AGGREGATION

(71) Applicant: Cisco Technologies, Inc., San Jose, CA (US)

(72) Inventors: Ijsbrand Wijnands, San Jose, CA (US); Greg Shepherd, San Jose, CA (US); Christian Martin, San Jose, CA (US); Rajiv Asati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 14/164,113

(22) Filed: Jan. 24, 2014

(65) Prior Publication Data

US 2015/0215198 A1    Jul. 30, 2015

(51) Int. Cl.
*H04L 12/709*   (2013.01)
*H04L 12/723*   (2013.01)
*H04L 12/721*   (2013.01)

(52) U.S. Cl.
CPC ............ *H04L 45/245* (2013.01); *H04L 45/507* (2013.01); *H04L 45/566* (2013.01)

(58) Field of Classification Search
None
See application file for complete search history.

(56) References Cited

U.S. PATENT DOCUMENTS

| | | | | |
|---|---|---|---|---|
| 7,336,648 B1* | 2/2008 | Sasagawa | | 370/351 |
| 8,000,327 B1* | 8/2011 | Minei et al. | | 370/392 |
| 2003/0145105 A1* | 7/2003 | Desineni et al. | | 709/238 |
| 2008/0159285 A1* | 7/2008 | de Heer | | 370/390 |
| 2008/0186852 A1* | 8/2008 | Sami et al. | | 370/235 |

* cited by examiner

*Primary Examiner* — Hassan Kizou
*Assistant Examiner* — Hashim Bhatti
(74) *Attorney, Agent, or Firm* — Patterson + Sheridan, LLP

(57) ABSTRACT

Techniques are disclosed for aggregating label-switched paths (LPSs). One method for aggregating LSPs may include a first node comparing forwarding equivalence classes (FECs) associated with respective label-switched paths (LSPs). The first node identifies FECs that differ by a given number of bits, such as one or two bits based on the comparison. The first node generates an aggregate FEC that masks out the differing bits, thereby reducing the number of LSPs. The first node transmits the aggregate FEC to an ingress node.

20 Claims, 4 Drawing Sheets

LABEL-SWITCHED PATH AGGREGATION

TECHNICAL FIELD

Embodiments of the present disclosure generally relate to network communications and, more particularly, to multicast data transmissions with aggregated label-switched paths.

BACKGROUND

In network communications, "multicast" generally refers to transmitting data to multiple receivers simultaneously using a single transmission stream from a source. Multicast may be contrasted with unicast, which involves transmitting data to multiple receivers using separate transmission streams for each receiver, and broadcast, which entails transmitting data to every node within reach on the network rather than to a list of specific nodes. By sending only a single transmission stream intended for multiple receivers (e.g., using a multicast address for addressing a group of receivers), multicast conserves bandwidth as compared to unicast. Accordingly, multicast is often used in streaming media applications, such as Internet Protocol television (IPTV), stock tickers, streaming digital audio, as well as in a variety of other Internet Protocol (IP) applications.

Multiprotocol Label Switching (MPLS) may be used to provide multicast services over high-performance telecommunications networks. In MPLS, data is directed from one network node to the next based on short path labels rather than long network addresses, avoiding complex lookups in a traditional routing table. The labels in MPLS identify forwarding equivalence classes (FECs). Each FEC designates a set of packets that may be mapped to a label-switched path (LSP), which is a path through an MPLS network set up by a signaling protocol, such as label distribution protocol (LDP) and multicast label distribution protocol (mLDP). In unicast segmented routing using MPLS, the number of LSPs may be reduced by adding more information into a packet. For example, the MPLS header of the packet may be populated with a stack of labels, so that the packet follows a pre-routed path along which the nodes each remove (pop) the top label of the removed packet and forward the packet according to the next label. In such a case, no end-to-end LSP is needed to forward the packet. This approach of populating MPLS headers with label stacks does not work well with multicast, however, as there is typically not enough space in the label stack to encode all of the multicast receivers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DESCRIPTION OF EXAMPLE EMBODIMENTS

Overview

Figure 1:
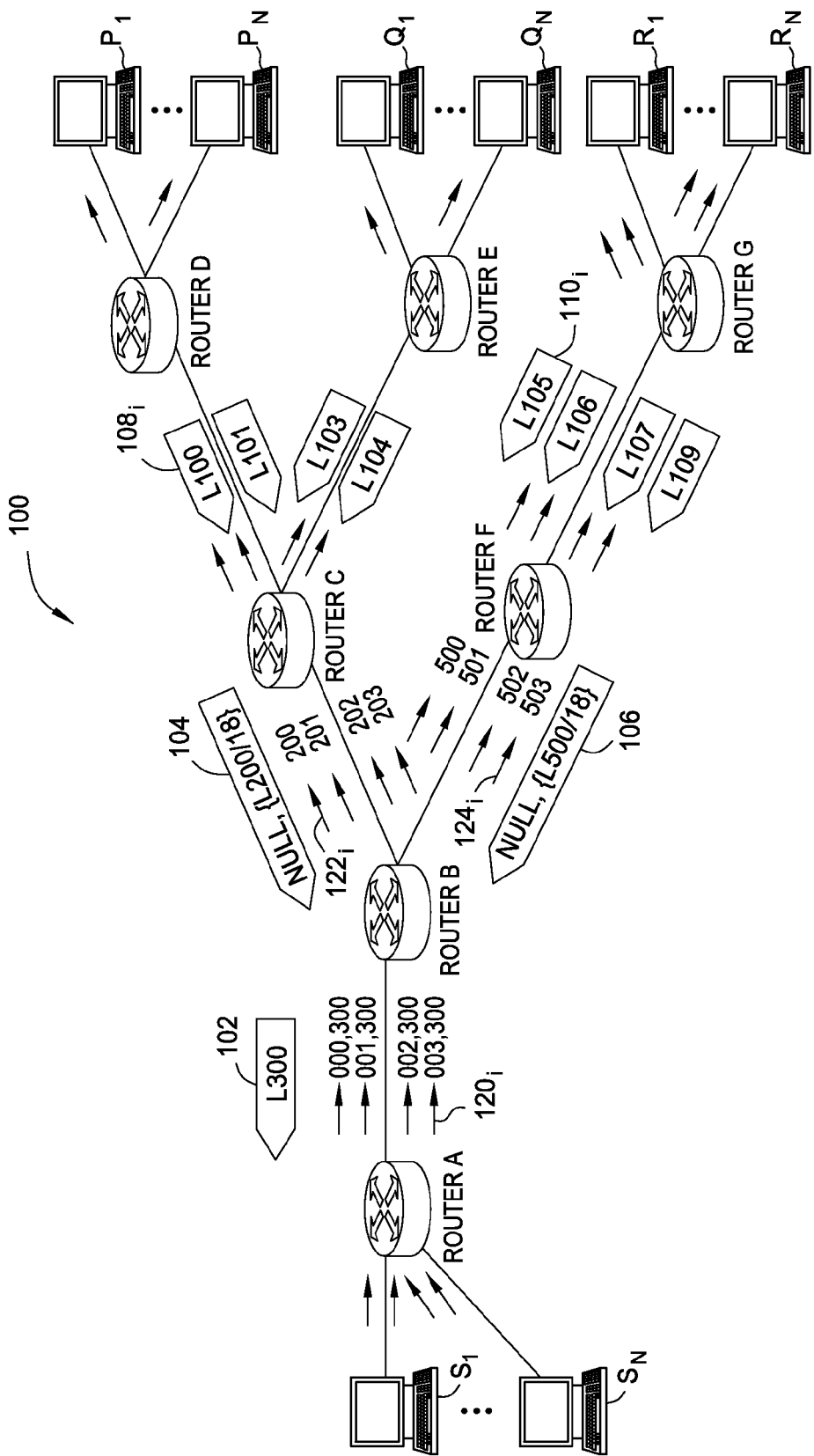
FIG. 1 illustrates an approach for aggregating label-switched paths and forwarding packets, according to an embodiment.

Embodiments presented herein generally relate to aggregating label-switched paths (LSPs). One embodiment presented herein provides a method for reducing LSPs in multicast routing. The method generally comprises comparing, by a first node, forwarding equivalence classes (FECs) associated with respective LSPs. The method further includes, for FECs that differ by a given number of bits: generating, by the first node, an aggregate FEC that masks out the differing bits, thereby reducing the number of LSPs, and transmitting, by the first node, the aggregate FEC to an ingress node.

Example Embodiments

Embodiments described herein provide multicast services over a data communication network including multiple network elements (also referred to as nodes). With multicast, a receiver expresses interest in receiving packets sent to a specific multicast address (also called a "multicast group address" or simply "group," for short). The receiver is referred to as a listener or a group member. Receivers interested in receiving data flowing to a particular group may join that group using a variety of protocols (e.g., Internet Group Management Protocol (IGMP) or Multicast Listener Discovery (MLD)). A multicast source (e.g., a server) sends packets with the destination Internet Protocol (IP) address set to a particular multicast group address. For example, the multicast source may stream IPTV, stock tickers, digital audio, and the like to the group address. Because there may be multiple receivers, the path that multicast packets travel often has numerous branches, and a multicast data path is typically referred to as a distribution tree. Data flow through the distribution trees is sometimes referenced in terms of upstream and downstream. The term "downstream" generally refers to the flow of packets being forwarded by the network nodes toward the receivers, and the term "upstream" generally refers to the data flow of packets being forwarded by the network nodes toward the source (i.e., towards a multicast sender).

As discussed, Multiprotocol Label Switching (MPLS) may be used to provide multicast services over high-performance telecommunications networks. In MPLS, data is directed from one network node to the next based on short path labels rather than long network addresses, avoiding complex lookups in a traditional routing table. The labels in MPLS identify forwarding equivalence classes (FECs). Each FEC designates a set of packets that may be mapped to a label-switched path (LSP), which is a path through an MPLS network set up by a signaling protocol, such as label distribution protocol (LDP) and multicast label distribution protocol (mLDP). The FEC may encode a multicast source address and a group address, but embodiments disclosed herein are not limited to FECs that include IP addresses. An LSP begins at an ingress router, which receives a normal IP packet, and applies a label to the packet to represent the FEC to which the packet is assigned (based on network layer destination address). The ingress router then forwards the packet along to the next router, which swaps the packet's incoming outer label for an outgoing label based on a lookup in a forwarding table, and forwards the packet to the next router. The last router, an egress router, in the path removes the label from the packet and forwards the packet based on the header of its next layer, for example IPv4. Due to the forwarding of packets through an LSP being opaque to higher network layers, an LSP is also sometimes referred to as an MPLS tunnel.

In MPLS, the multicast distribution tree is formed by building LSPs for each multicast flow. mLDP is one known label distribution protocol for building MPLS distribution trees. As discussed, each LSP is identified by a FEC that encodes a source and a group address of the LSP, among other things. Such source and group addresses are typically allocated by the multicast service provider (e.g., an IPTV provider), which often assigns a single source address and a number of different group addresses. For example, an IPTV provider may assign, to a number of streaming channels, the same source address and respective group addresses that are contiguous. As another example, mLDP in-band signaling the source and group may all be in the same range, and only differ on a /24 boundary (or less). As a result, the FECs for different LSPs can differ by only two or three bits. Continuing the IPTV example, the provider may assign the same source address and group addresses that only differ by two bits for four channels, so that the FECs that include the source and group address only differ by two bits.

In one embodiment, a router compares FECs and determines whether FECs for different LSPs differ by only a given number of bits, such as two or three bits. Any egress or transit node may make this comparison. More upstream routers are more likely to have flows coming together with FECs that differ by only the given number of bits. The position of the differing bits generally makes no difference. If FECs are identified that differ by only the given number of bits, then the router merges the FECs by masking out the differing bits. For example, four FECs that differ by two bits or eight FECs that differ by three bits may be merged by masking out the differing bits. The router then sends the aggregated FEC and a merge label range upstream, as opposed to sending the multiple original FECs and corresponding multiple labels. Doing so effectively aggregates the LSPs identified by the FECs into a single LSP, as a single aggregated FEC that identifies the (aggregated) LSP is sent upstream. That is, upstream routers are sent a single LSP rather than multiple original LSPs. This may reduce the number of control-based states so that less resources are used (e.g., to store forwarding table entries associated with LSPs) and the network may operate faster (e.g., LSP converging can be performed faster). As used herein, LSP converging refers to re-routing an LSP through a different path, e.g., after a failure. Having fewer LSPs generally reduces the time it takes to re-converge. Accordingly, it may be beneficial to aggregate LSPs so that the network converges faster.

An ingress router, i.e., the router that is the starting point for an LPS where an MPLS packet is attached, is configured to de-aggregate the merged FECs using the mask and regenerate the original FECs. As discussed, the mask indicates which bits were variable in the original FECs, and this information allows the original FECs to be recreated at the ingress router. The source and group addresses in these regenerated FECs are then stored as multicast forwarding state entries in the ingress router's forwarding table, typically referenced in terms of "(S,G)" states. In (S,G) notation, the "S" represents the source's IP address, and the "G" refers to the multicast group address.

When the source (e.g., a server) sends a multicast data packet, the IP header of the packet typically includes "S" as the packet's source address and "G" as the packet's destination address. When the ingress router receives such a packet, the ingress router adds two MLSP labels to the packet: a top label associated with the aggregate FEC and an inner label with a multicast flow identifier. The ingress router then sends this packet downstream. The packet is forwarded according to the aggregated LSP defined by the aggregated FEC, until the packet reaches a router upstream to the router which initiated the aggregation (or the router which initiated the aggregation itself in the case of upstream label assignment), which strips off the top label associated with the aggregate FEC and forwards the packet according to the inner label. The router that initiated the aggregation may then map the incoming label of a packet to a set of forwarding table entries associated with the multiple original FECs (as opposed to the aggregated FEC), add the labels corresponding to those original FECs, and forward the packets to downstream routers, thereby reproducing the individual LSPs that were aggregated (e.g., reproducing the original IPTV channels).

FIG. 1 illustrates an approach for aggregating label-switched paths and forwarding packets, according to an embodiment. As shown, multiple receivers P1-PN, Q1-QN, R1-RN may join one or more multicast groups receiving traffic from servers S1-SN. In response, routers A-G build multicast distribution tress from the receivers P1-PN, Q1-QN, R1-RN to the multicast sources S1-SN. In MLSP, the distribution trees are built starting from the egress routers D, E, G, as downstream routers make decisions to bind labels to FECs and send this binding upstream. Illustratively, the labels L100-L101, L103-L104, and L105-L108, each of which is bound to a corresponding FEC, are sent from routers D, E, and G respectively to upstream routers C and F.

Routers C and F receive the binding of labels L100-L101, L103-L104, and L105-L108 to FECs and compare the FECs to determine if the FECs differ by only a given number of bits. Here, the FECs that differ by the given number of bits also are contiguous. Assume the labels L100, L101, L102, and L103 are associated, respectively, with contiguous FECs that differ by two bits: {A, 0x1000}/32, {A, 0x1001}/32, {A, 0x1002}/32, and {A, 0x1003}/32. For example, consider four IPTV channels with the following FECs:

[ipv4 192.11.1.0.224.1.1.1]
[ipv4 192.11.1.1.224.1.1.1]
[ipv4 192.11.1.2.224.1.1.1]
[ipv4 192.11.1.3.224.1.1.1].

These FECs differ by two bits and may be encoded in hexadecimal form as follows:
03000800B0100E0010101
03000800B0101E0010101
03000800B0102E0010101
03000800B0103E0010101.

After identifying such FECs that differ by only the given number of bits, router C merges the FECs into a single merged FEC {A, 0x1000}/30 by applying a mask that masks out the differing bits. Continuing the IPTV example, the FECs (in hexidecimal form) may be merged together into the merged FEC 03000800B0100E0010101 by applying the mask FFFFFFFFFFFFCFFFFFFFF. Doing so creates a merged LSP identified by the merged FEC.

When LSPs are merged in the foregoing manner, the granularity of the individual LSPs is lost. In order to reduce or eliminate packet flooding due to this loss of granularity, the router assigns a merge label range which is a contiguous set of labels assigned for the individual LSPs and can be represented using a mask, in a similar way as the FECs. As shown, router C sends the binding of a merged FEC to label range 200/18 upstream, which corresponds to the set of labels L200, L201, L202, and L203. This assumes that the label is 20 bits. Similarly, router F sends the binding of another merged FEC to a label range L500/18 upstream, which corresponds to the set of labels L500, L501, L502, and L503. That is, router C expects traffic to be received in the L200 range, while router F expects traffic to be received in the L500 range. Router C sends a NULL label along with the label range L200/18, and similarly router F sends a NULL label with label range L500/18. The NULL label causes the upstream router B to pop an outer label of a received packet before mapping the outer labels with the ranges advertised (L200/18 and L500/18) and forwarding the packet, as discussed in greater detail below.

Router B stores, in its forwarding table, the merged FEC {A, 0x1000}/30 and the merge label ranges L200/18 and L500/18, thereby reducing the number of forwarding entries stored. In addition, Router B binds its own the label L300 to the merged FEC, and sends this binding upstream to router A, which is the ingress router in this example. When router A receives a merged FEC (and associated mask), router A de-aggregates the merged FEC using the mask. That is, router A recreates the original LSPs (that were aggregated) so that incoming packets can be assigned to these LSPs, as opposed to the aggregated LSP, and forwarded.

Ingress router A forwards packets after adding the label L300 received from router B as an outer label in the MPLS label stack, as well an inner label that is automatically generated using the bits that were masked out to create the aggregated FEC, which are also the least specific part of the merge label range. For example, if two bits are aggregated, then router A may add label 000 for the FEC with fragment 00, label 001 for the FEC with fragment 01, label 002 for the FEC with fragment 10, and label 003 for the FEC with fragment 11. As shown, this results the packets being forwarded by router A for the four flows (e.g., IPTV channels) having MPLS stacks 000,300; 001,300; 002,300; and 003,300. If multiple routers along the path to the ingress router perform merging, a stack of inner labels may be used. Note, the labels 000, 001, 002, and 003 are upstream assigned, which differs from traditional MPLS in which downstream routers allocate labels and advertise the labels upstream. However, the labels 000, 001, 002, 003 are not actually allocated but are simply the value of the bits that were aggregated used as a label.

Upon receiving packets from router A, router B pops off (i.e., removes) the outer label 300. However, packets cannot be forwarded with the inner labels 000, 001, 002, 003 alone, as these are reserved labels with certain expected behavior. To avoid forwarding reserved labels, router B maps the outgoing outer label with the range previously advertised, as follows: (inner label/range label). That is, the new outer label is generated by performing a calculation in which the inner label is added to the label range (i.e., [inner label+range Label=outer label]). In another embodiment, special purpose labels may also be used. As discussed, the ranges advertised by routers C and F are L200/18 and L500/18, respectively. As a result, at least in the example under discussion, router A maps these label ranges and adds, for packets forwarded to router C, the labels 200, 201, 202, and 203. For example, the outer label 200 may be mapped to range L200/18 to add indexing to the outer label 200, thereby producing a label such as 200, 201, 202, 203, etc. Similarly, router A adds, for packets forwarded to router F, the mapped labels 500, 501, 502, and 503.

The pop and map is forwarding logic that is different from a traditional context lookup approach, in which router B would strip the outer label 300 and add new outer labels (e.g., labels 240 and 250) that routers C and F expect to the label stack. For example, the labels of packets forwarded to router C and F may be, e.g., x00,240; x01,240; x02,240; x03,240 and x00,250; x01,250; x02,250; x03,250, respectively. Using context labels requires a router to maintain separate MPLS forwarding tables for each upstream router that assigns labels, as labels can be reused and therefore downstream labels can collide with upstream assigned labels. When a packet arrives, the router determines that the LSP is rooted in a given upstream router using (e.g., the outer label 240), and then look up the inner label (e.g., x00) in another forwarding table.

A possible advantage of pop and map is that only one forwarding table lookup is required, as opposed to the two lookups in traditional a context lookup approach, although traditional context lookup may also be used. As discussed, the downstream router itself assigns the merge label range, while the upstream router does not actually allocate the labels 000, 001, 002, 003, etc. that are created from the merged bits. Accordingly, potential problems with label collisions may be reduced or eliminated, as the downstream router is able to assign a unique label range, and downstream routers need not maintain multiple forwarding tables for upstream routers. For example, C allocated the label range L200/18. With pop and map, when router C receives a packet a label that is, e.g., L200, L201, etc. router C simply forwards the packet according to a programmed forwarding table entry associated with that label. Assuming such an entry indicates that the local label is L201 and the remote label advertised by the downstream router is L100, as advertised by router D, then, router C may remove label L201 and add label L100, and then forward the packet to router D. Then, when router D receives the packet with the label L101 from router C, router D removes the MPLS header and forwards the packets to the receivers P1-PN that have joined the multicast group associated with label L101. Packets with other labels (e.g., labels 200, 202, 203, etc.) that are received by routers C and F are forwarded in a similar manner to routers D and E and receivers P1-PN, Q1-QN, and R1-RN, as appropriate.

Figure 2:
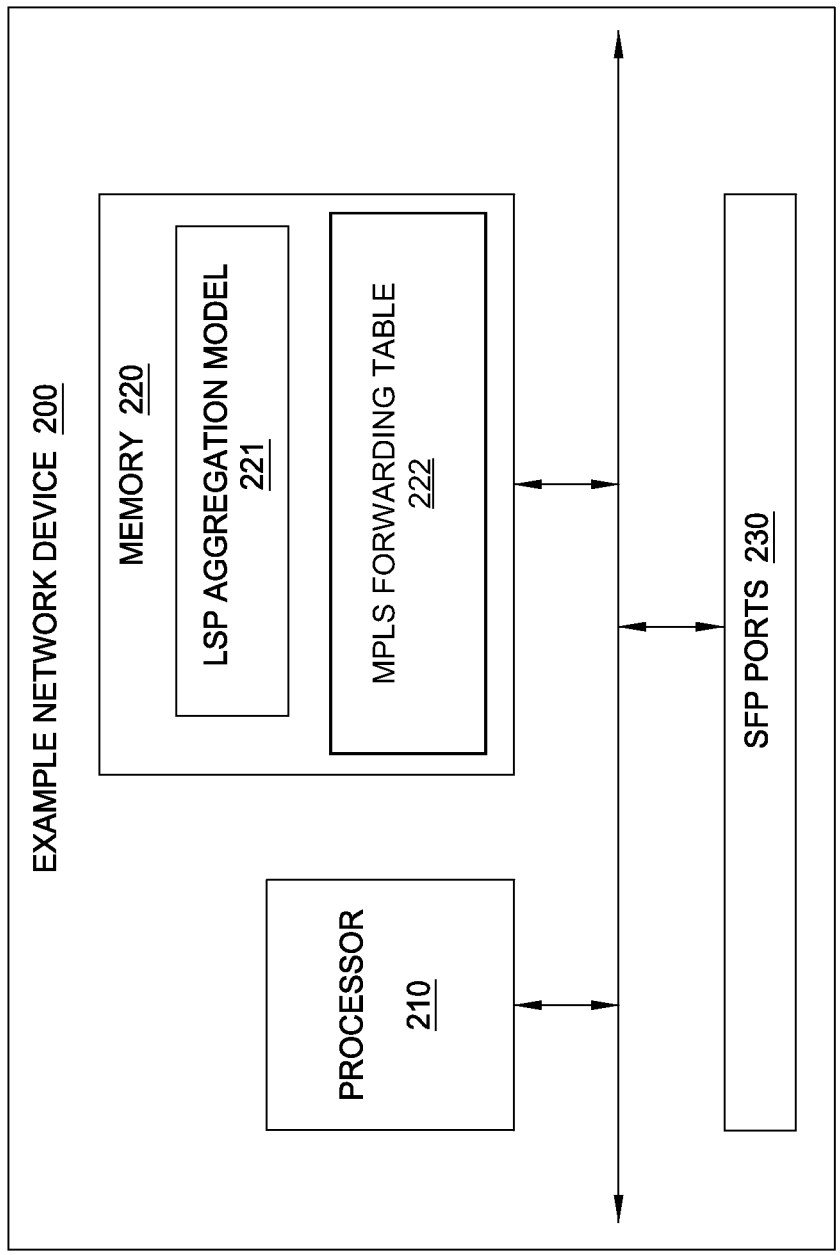
FIG. 2 illustrates an exemplary network device, according to an embodiment.

FIG. 2 illustrates an exemplary network device 200, according to an embodiment. The exemplary network device 200 may be a router in one embodiment. As used herein the term "router" generally refers to devices that forward packets based on network and higher layer information, according to the Open Systems Interconnection (OSI) model. In other embodiments, the network device 200 may also be a switch, gateway, or other network device. In a particular embodiment, the network device 200 may be a specially configured router such as those available from Cisco Systems, Inc. of San Jose, Calif.

As shown, the network device 220 includes a processor 210, a memory 220, small form-factor pluggable (SFP) ports 230 (e.g., Ethernet ports), and a bus (e.g., a PCI bus). The components of the network device 200 are provided for explanatory purposes. A person skilled in the art can configure the network device 200 in many other ways. When acting under the control of appropriate software or firmware, the processor 220 is responsible for such router tasks as routing table computations, network management, and general processing of packets. The processor 220 typically accomplishes all of these functions under the control of software including, e.g., an operating system and any appropriate applications software stored in the memory 220.

Illustratively, the memory 220 includes a MPLS forwarding table 222 and an LSP aggregation 221 module. Although shown as stored in memory 220, software components illustrated in FIG. 2 may instead be implemented in hardware in some embodiments. The MPLS forwarding table 222 is configured to store entries for forwarding packets with MPLS labels received by the network device 220. In one embodiment, one MPLS forwarding table may be maintained for each LSP. When a labeled packet arrives, the network device 200 determines, based on the label, one or more corresponding entries in the MPLS forwarding tables 222. These entries may indicate the packet's next hop, as well as an operation to perform on the packet's label stack, such as replacing the label at the top of the label stack with a particular new label, popping the label stack, and a pop and map operation, discussed in greater detail below. The processor 210 may perform such an operation, and forward the packet to the next hop, according to the MPLS forwarding table entry.

The LSP aggregation module 221 is configured to merge FECs, and thereby aggregate LSPs identified by those FECs, when the FECs are determined to differ by only a given number of bits (e.g., two or three bits). In one embodiment, the LSP aggregation module 221 may compare FECs to determine whether they differ by the given number of bits and, if such is the case, mask out the differing bits to create a new merged FEC. As discussed in greater detail below, the LSP aggregation module 221 may advertise the merged FEC and the mask, as well as an associated merge label range, upstream. An ingress router may de-aggregate the merged FEC using the mask and two MLSP labels to the packets: a top label associated with the aggregate FEC and an inner label with a multicast flow identifier. As discussed, this may reduce or eliminate packet flooding by making it possible to identify individual multicast flows even after the LPSs are aggregated. Such is packet is forwarded according to the aggregated LSP defined by the aggregated FEC, until the packet reaches network device 200 upstream to the router that initiated the aggregation. Network device 200 then strips off the top label associated with the aggregate FEC and forwards the packet according to the inner label. In an alternative embodiment in which upstream label allocation is performed, the router that initiated the aggregation itself may strip off the top label.

Figure 3:
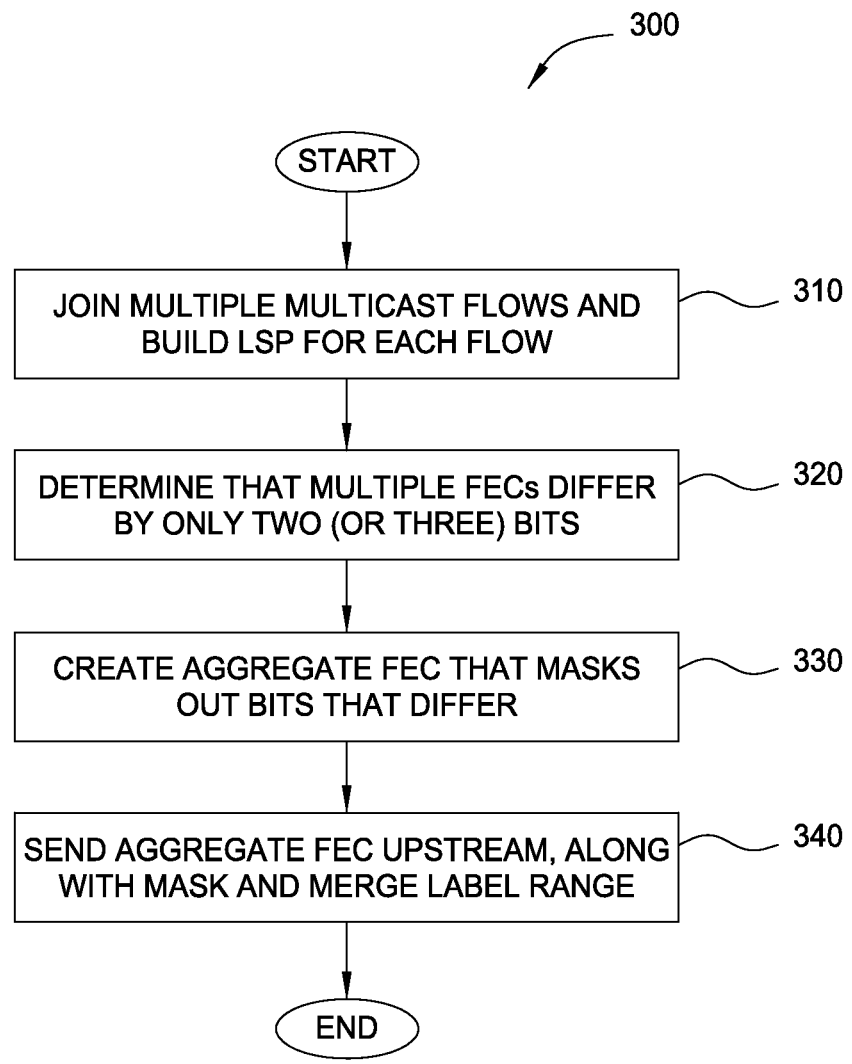
FIG. 3 illustrates a method for aggregating label-switched paths, according to an embodiment.

FIG. 3 illustrates a method 300 for aggregating label-switched paths, according to an embodiment. As shown, the method 300 begins at step 310, where an egress router joins multiple multicast flows, and an LSP is built for each flow. As discussed, the egress router may decide to bind a particular label to a FEC that identifies an LSP and advertise the binding to upstream routers. This process may repeat at the upstream routers, until a multicast distribution tree is built from the egress node to the ingress node. mLDP is one known label distribution protocol that may be used to build such a distribution tree.

At step 320, the egress router determines multiple FECs that differ by only two (or three) bits. As discussed, the differing bits are contiguous. In one embodiment, the FEC may be an LSP identifier that encodes source and group address values. It is not uncommon for multicast service providers to assign source and group addresses in a manner so that multiple FECs differ by only a few bits. In one embodiment, the source and group addresses may by assigned specifically to achieve this. Although discussed with respect to an egress router, comparing multiple FECs to determine whether those FECs differ by a given number of a bits, as well as the merging of FECs, may generally be performed by any egress or transit router. The FEC may be an LSP identifier that is unrelated to IP address. For example, the FECs may be global IDs randomly or contiguously allocated by the ingress router. Such FECs may also be compared on a bit-by-bit basis to determine if multiple FECs differ by only a given number of bits.

At step 330, the egress router creates an aggregate FEC that masks out bits that differ in the multiple FECs that differ by only two or three bits. That is, the egress router creates a new FEC which has the two or three bits that differ masked out. For example, FECs
03000800B0100E0010101
03000800B0101E0010101
03000800B0102E0010101
03000800B0103E0010101
differ by two bits. Accordingly, in one embodiment, the egress router may merge the four FECs into the single merged FEC
03000800B0100E0010101
by applying the mask:
FFFFFFFFFFFFCFFFFFFFF.
The mask identifies the bits that differ in the original FECs.

At step 340, the egress router sends the aggregate FEC upstream, along with the mask and a merge label range. That is, a different, single LSP that is represented by the aggregated FEC is sent upstream, rather than sending out multiple LSPs associated with the original, un-aggregated FECs. For example, the original FECs may be associated with four LSPs for four different IPTV channels with the same source address but different group addresses. Such FECs may differ by Transit nodes between the egress router and the ingress router see the LSP represented by the aggregated FEC as a null LSP. The ingress router de-aggregates the aggregated FEC using the mask and forwards multicast traffic, as discussed in greater detail below with respect to FIG. 3.

The merge label range is a contiguous set of labels assigned to the individual LSPs associated with the original FECs, and can be represented in a similar way as the merged FECs using a mask. For example, the merge label range 200/18 includes labels 200, 201, 202, and 203. The egress router may advertise this merge label range for a set of original FECs which differed by 2 bits and were aggregated into one aggregate FEC, as illustrated in FIG. 1.

Figure 4:
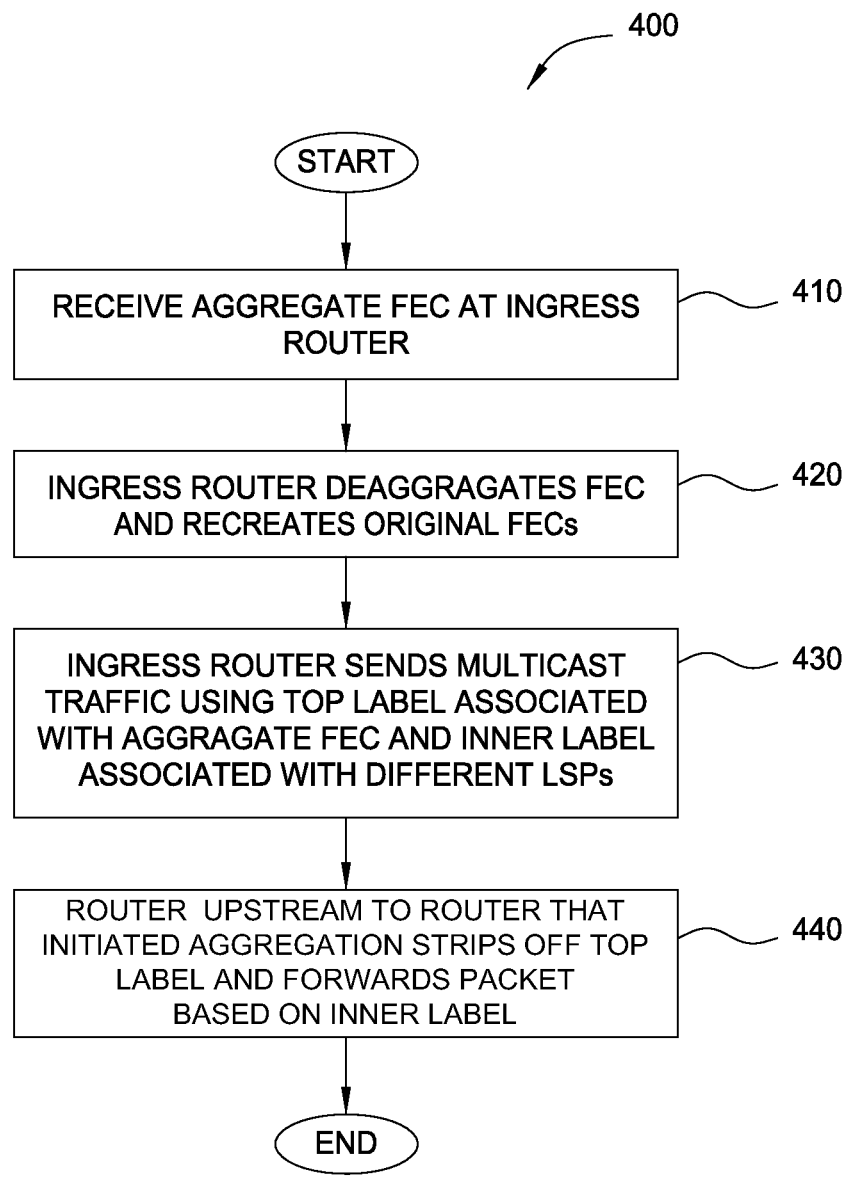
FIG. 4 illustrates a method for sending multicast traffic with aggregated label-switched paths, according to an embodiment.

FIG. 4 illustrates a method 400 for sending multicast traffic with aggregated label-switched paths, according to an embodiment. As shown, the method 400 begins at step 410, where an ingress router receives an aggregate FEC and a mask. The ingress router may also receive, from its downstream router, a label or label range that the downstream router decided to bind to the aggregated FEC. As discussed, the aggregate FEC is a FEC created by masking out two or three bits that differ in multiple FECs, with the mask indicating which bits differ.

At step 420, the ingress router de-aggregates the FEC and recreates the original FECs that were aggregated. This de-aggregation is essentially the reverse of the process in which the aggregate FEC was created by applying the mask. For example, the merged FEC 03000800B0100E0010101, discussed above, may be de-aggregated using the mask FFFFFFFFFFFFCFFFFFFFF to obtain the four original FECs 03000800B0100E0010101, 03000800B0101E0010101, 03000800B0102E0010101, and 03000800B0103E0010101. The ingress router de-aggregates the merged FEC, as the ingress router is the root of the tree and should understand how to forward packets including the source and group addresses of the original FECs.

At step 430, the ingress router sends multicast traffic using a top label associated with the aggregated FEC and an inner label associated with different LSPs. More specifically, the bits used to merge FECs may be used as the inner labels. As discussed, use of such inner labels may reduce or eliminate packet flooding by making it possible to identify individual multicast flows even after LPSs are aggregated. If multiple routers along the path to the ingress router perform LSP merging, a stack of inner labels may be used.

For an incoming packet, the ingress router examines the packet and assigns the packet to one or more FECs. For example, the IP header of the packet may include a source address that is a multicast source matching that of a given FEC and a destination address that is the group address of the same FEC. In such a case, the ingress router maps this matching FEC to an appropriate forwarding table entry to determine how to forward the incoming packet. If the ingress router determines that the FEC is one of the FECs that has been merged into an aggregated FEC, then the ingress router adds a top label associated with the aggregated FEC and an inner label using the bits that were masked out during the aggregation. For example, if two bits were masked out, then a packet that matches the original FEC with fragment 00 will have inner label 000, and similarly the packet that matches the original FEC with fragment 01 will have inner label 001, etc.

At step 440, a router upstream to the router that initiated the aggregation strips off the top label of received packets and forwards the packets based on their inner labels. Note in an alternative embodiment in which upstream label allocation is performed, the router which initiated the aggregation may itself strip off the top label.

Before reaching the upstream router that strips off the top label, the packet may be forwarded normally according to MPLS, i.e., the routers map the incoming label to a set of forwarding table entries and forward the packet according to the information in the forwarding table entry. In one embodiment, the forwarding table entry of the upstream router that strips off the top label may indicate a pop and map operation in which the router removes the incoming outer label and adds a label that is the outgoing outer label mapped with a merge label range. That is, the router adds indexing to the outgoing outer label based on the inner label. For example, the router that initiated the aggregation may allocate a label range/18, and send a NULL label and the label range to its upstream node. Due to the NULL, the upstream router will pop the incoming outer label and forward the packet with the incoming inner label mapped to the label range. For example, the incoming label stack may be 001,300, and the upstream router may pop the 300 label and map the outgoing outer label 200 with a label range such as L200/18 to produce the new label 201. As discussed, doing so can avoid two forwarding table lookups which would be required under traditional context lookups.

The router that initiated the aggregation maps the incoming label of a packet to a set of forwarding table entries associated with the multiple original FECs (as opposed to the aggregated FEC), adds the labels corresponding to those original FECs, and forwards the packets to downstream routers, thereby reproducing the individual LSPs that were aggregated (e.g., reproducing the original IPTV channels).

Advantageously, certain embodiments disclosed herein permit LSPs to be aggregated in MPLS-based multicast routing. Doing so may reduce the number of control-based states so that less resources are used (e.g., to store forwarding table entries for LSPs) and the network operates faster (e.g., LSP converging can be performed faster). As discussed, LSP converging refers to re-routing an LSP through a different path, e.g., after a failure. Having fewer LSPs generally reduces the time it takes to re-converge. Accordingly, it may be beneficial to aggregate LSPs so that the network converges faster. In addition, a pop and map forwarding behavior is discussed herein, which may reduce the number of forwarding table lookups required to one, as opposed to two lookups in traditional context lookup.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A computer-implemented method, comprising:
   comparing, by a first node, bits of forwarding equivalence classes (FECs) associated with respective label-switched paths (LSPs);
   for FECs that differ by a given number of bits:
      generating, by the first node, an aggregate FEC that masks out the differing bits, thereby reducing the number of LSPs, and
      transmitting, by the first node, the aggregate FEC to an ingress node.

2. The method of claim 1, further comprising, requesting, by the first node, a merge label range associated with the given number of bits, wherein the masked out different bits are used in an inner label in packet forwarding.

3. The method of claim 2, further comprising,
   de-aggregating, by the ingress node, the aggregate FEC;
   and forwarding packets using the merge label range.

4. The method of claim 3, wherein the forwarding includes:
   removing, by a second node upstream to the first node, an outer label; and
   mapping the inner label with a range label associated with the aggregate FEC.

5. The method of claim 3, wherein the aggregate FEC is generated using a mask which indicates which bits were used to aggregate the FECs associated with the respective LSPs, and wherein the ingress node uses the mask to de-aggregate the aggregate FEC.

6. The method of claim 3, wherein the forwarding is performed using context lookup.

7. The method of claim 1, wherein the given number of bits is either two or three bits.

8. The method of claim 1, wherein the FECs are generated from contiguous internet protocol (IP) addresses.

9. An apparatus comprising:
   at least one processor; and
   a memory, wherein the memory includes a software module configured to perform operations comprising:
      comparing bits of forwarding equivalence classes (FECs) associated with respective label-switched paths (LSPs); and
      for FECs that differ by a given number of bits:
         generating an aggregate FEC that masks out the differing bits, thereby reducing the number of LSPs, and
         transmitting the aggregate FEC to an ingress node.

10. The apparatus of claim 9, the operations further comprising, request a merge label range associated with the given number of bits, wherein the masked out different bits are used in an inner label in packet forwarding.

11. The apparatus of claim 10, wherein the aggregate FEC is de-aggregated by the ingress node, and wherein packets are forwarded using the merge label range.

12. The apparatus of claim 11, wherein the forwarding includes:
   removing, by a node upstream to the apparatus that generated the aggregate FEC, an outer label of a received packet; and
   mapping the inner label with a range label associated with the aggregate FEC.

13. The apparatus of claim 11, wherein the aggregate FEC is generated using a mask which indicates which bits were used to aggregate the FECs associated with the respective LSPs, and wherein the ingress node uses the mask to de-aggregate the aggregate FEC.

14. The apparatus of claim 11, wherein the forwarding is performed using context lookup.

15. The apparatus of claim 9, wherein the given number of bits is either two or three bits.

16. The apparatus of claim 9, wherein the FECs are generated from contiguous internet protocol (IP) addresses.

17. An apparatus comprising:
   means for comparing bits of forwarding equivalence classes (FECs) associated with respective label-switched paths (LSPs); and
   means for, for FECs that differ by a given number of bits:
      generating an aggregate FEC that masks out the differing bits, thereby reducing the number of LSPs, and
      transmitting the aggregate FEC to an ingress node.

18. The apparatus of claim 17, wherein the aggregate FEC is de-aggregated by the ingress node, and wherein packets are forwarded using the merge label range.

19. The apparatus of claim 18, wherein the forwarding includes:
   removing, by a node upstream to the apparatus that generated the aggregate FEC, an outer label of a received packet; and
   mapping the inner label with a range label associated with the aggregate FEC.

20. The apparatus of claim 18, wherein the aggregate FEC is generated using a mask which indicates which bits were used to aggregate the FECs associated with the respective LSPs, and wherein the ingress node uses the mask to de-aggregate the aggregate FEC.

* * * * *